United States Patent
Hayashi et al.

(10) Patent No.: US 6,696,504 B1
(45) Date of Patent: Feb. 24, 2004

(54) EXTRUDED STYRENE RESIN FOAMS, AND METHODS FOR PRODUCING THE SAME

(75) Inventors: Takahiro Hayashi, Osaka (JP); Osamu Kobayashi, Shiga (JP); Jun Fukuzawa, Osaka (JP); Hiroshi Fujiwara, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/471,402

(22) Filed: Dec. 23, 1999

Related U.S. Application Data (63) Continuation-in-part of application No. PCT/JP99/02177, filed on Apr. 23, 1999.

(30) Foreign Application Priority Data

| Apr. 23, 1998 | (JP) | 10/112941 |
| Jul. 8, 1998 | (JP) | 10/192740 |
| Nov. 20, 1998 | (JP) | 10/331722 |

(51) Int. Cl.$^7$ .................................................. C08J 9/12
(52) U.S. Cl. ........................... 521/79; 521/88; 521/910; 264/53
(58) Field of Search ......................... 521/88, 79, 910; 264/53

(56) References Cited

U.S. PATENT DOCUMENTS 5,064,874 A * 11/1991 Motani et al. ............... 521/146
5,453,454 A * 9/1995 Alicke et al. ............... 521/79

FOREIGN PATENT DOCUMENTS

| EP | 0 626 421 A | 11/1994 | |
| EP | 0 814 119 A | 12/1997 | |
| JP | 53-2564 | 1/1978 | |
| JP | 3-109445 | 5/1991 | |
| JP | 7-507087 | 8/1995 | |
| JP | 7-278338 | 10/1995 | |
| JP | 8-510495 | 11/1996 | |
| JP | 11-158317 | * 6/1999 | C08J/9/14 |

* cited by examiner

*Primary Examiner*—James J. Seidleck
*Assistant Examiner*—Melanie Bissett
(74) *Attorney, Agent, or Firm*—Armstrong, Westerman & Hattori, LLP (57) ABSTRACT

Production of extruded styrene resin foams which are excellent in environmental compatibility and retain highly efficient thermal insulation property and have appropriate strength properties is disclosed which is characterized by using as a blowing agent a blowing agent comprising mainly 40% by weight or more and 85% by weight or less, based on the whole amount of the blowing agent, of at least one ether selected from the group consisting of dimethyl ether, methyl ethyl ether and diethyl ether, and 15% by weight or more and 60% by weight or less, based on the whole amount of the blowing agent, of at least one saturated hydrocarbon selected from the group consisting of saturated hydrocarbons having 3 to 5 carbon atoms. The production is further characterized by providing a more desirable cell structure such as a specified shape of cells or the presence of larger and smaller cells.

12 Claims, 4 Drawing Sheets

EXTRUDED STYRENE RESIN FOAMS, AND METHODS FOR PRODUCING THE SAME

This application is a continuation-in-part of international application PCT/JP99/02177 filed Apr. 23, 1999.

TECHNICAL FIELD

The present invention relates to an extruded styrene resin foam and a method for its production. Particularly, the present invention relates to a board-like extruded styrene resin foam which is excellent in environmental compatibility, retains highly efficient thermal insulating property and has appropriate strength properties, and hence useful, especially, as a thermal insulation material, and to a method for the production thereof.

BACKGROUND ART

Hitherto, extruded styrene resin foams have been widely used as thermal insulation materials for buildings because of their desirable workability and thermal insulation characteristic. Many prior patents proposed techniques which use flons typified by flon 12, flon 142b and flon 134a in order to impart excellent thermal insulation characteristic to styrene resin extruded foams, in combination with halogenated hydrocarbons which are easy to permeate through styrene resin, typified by methyl chloride and ethyl chloride in order to achieve desirable mechanical properties, thermal stability of foams and productivity. These techniques have been widely adopted as general production methods and have become common.

On the other hand, in recent years, attention has been given to the ozone layer problem and the global warming problem. From such a viewpoint, the use of flon 134a, which is suitable for protection of the ozone layer, is proposed. However, there is further demand for selection of preferable blowing agent in view of a greenhouse effect. In addition, methyl chloride, ethyl chloride and the like are believed to be preferable to be replaced if possible from the viewpoint of environmental sanitation.

JP, A, 53-2564 has proposed a thick styrene resin extruded foam board having a density of 30 to 40 kg/m$^3$ and an average cell size of less than 0.3 mm which can maintain good thermal insulation property semipermanently by adjusting a partial pressure of propane, butane or the like in cells to from 0.25 to 0.75 atm. However, as is apparent from the description or examples in the specification, there are restrictions such as the need of using methyl chloride together in order to produce the foam board in good productivity and the limitation of the foam density to a higher range in view of thermal insulation property.

The use of hydrocarbons containing no chlorine atom in molecule, ethers or inorganic gases such as carbon dioxide as a blowing agent has also been proposed.

On the other hand, JP, A, 7-507087 has disclosed a technique which uses dimethyl ether and carbon dioxide in combination in a specific proportion as a technique for providing a styrene resin extruded foam board having a thickness of 20 mm or more and a cross-sectional area of 50 cm$^2$ or more.

This patent gives attention to that when dimethyl ether, which is expected to have ability to form cells by diffusing through cell membranes, namely, cell-forming ability, is used as a blowing agent, a thick foam body can be obtained. It, however, is natural that a foam board for a thermal insulation material is demanded to be sufficient not only in thickness but also in other physical properties such as thermal insulation property and strength at the same time from an industrial viewpoint. This patent, however, has never studied whether or not the foam can satisfy such demands for thermal insulation property and the like which are of industrial necessity. Thus the problem of providing useful foams which are produced industrially has not been solved.

The present inventors have proposed, in JP, A, 3-109445, a method to improve thermal insulation property of a foam not only by relying upon a slightly permeable blowing agent contained in cells but also by forming a cell structure in which smaller and larger cells are present together.

Furthermore, the inventors have also proposed, in JP, A, 7-278338, an improved method for forming such a cell structure in which smaller and larger cells are present together, the method being more suitable for industrial production.

In view of such prior art, an object of the present invention is to provide an extruded styrene resin foam prepared by using a blowing agent with environmental compatibility, the foam being extremely suitable for industrial production and having excellent thermal insulation property and mechanical properties, and to provide a method for the production of the foam.

DISCLOSURE OF THE INVENTION

That is, the present invention provides the following extruded styrene resin foams and methods for the production of the same.

(1) An extruded styrene resin foam obtainable by extruding and foaming a styrene resin using a blowing agent, wherein the blowing agent comprises mainly 40% by weight or more and 85% by weight or less, based on the whole amount of the blowing agent, of at least one ether selected from the group consisting of dimethyl ether, methyl ethyl ether and diethyl ether, and 15% by weight or more and 60% by weight or less, based on the whole amount of the blowing agent, of at least one saturated hydrocarbon selected from the group consisting of saturated hydrocarbons having 3 to 5 carbon atoms.

(2) The extruded styrene resin foam as set forth in the preceding paragraph (1), wherein a weight ratio of the ether to the whole blowing agent is 50% by weight or more and 85% by weight or less, and a weight ratio of the saturated hydrocarbon to the whole blowing agent is 15% by weight or more and 50% by weight or less.

(3) The extruded styrene resin foam as set forth in the preceding paragraph (1), wherein a weight ratio of the ether to the whole blowing agent is 50% by weight or more and less than 70% by weight, and a weight ratio of the saturated hydrocarbon to the whole blowing agent is more than 30% by weight and 50% by weight or less.

(4) The extruded styrene resin foam as set forth in any one of the preceding paragraphs (1) to (3), wherein a cell anisotropic ratio k, which is defined by the formula:

$$k = a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfies the equation:

$$0.80 \leq k \leq 1.25$$

and an average cell size, a, in the thickness direction satisfies the relationship:

ti $0.24 \leq a \leq -1.1 \times k + 1.62$.

(5) A extruded styrene resin foam, which has a cell anisotropic ratio k, which is defined by the formula:

$$k=a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfying the equation:

$$0.80 \leq k \leq 1.25$$

and an average cell size, a, in the thickness direction satisfying the relationship:
ti $0.24 \leq a \leq -1.1 \times k+1.62$.

(6) The extruded styrene resin foam as set forth in the preceding paragraph (4) or (5), which has a density of 26 to 35 kg/m³.

(7) The extruded styrene resin foam as set forth in any one of the preceding paragraphs (1) to (6), wherein the cells constituting the foam comprise mainly smaller cells having a cell size of 0.25 mm or less and larger cells having a cell size of 0.3 to 1 mm, and the area of the smaller cells having a cell size of 0.25 mm or less accounts for 10 to 90% of a sectional area of the foam.

(8) The extruded styrene resin foam as set forth in any one of the preceding paragraphs (1) to (5) and (7), which has a density of 15 to 40 kg/m³.

(9) The extruded styrene resin foam as set forth in any one of the preceding paragraphs (1) to (8), which has a thermal conductivity of not more than 0.029 kcal/m·hr·° C.

(10) A method for producing an extruded styrene resin foam comprising heat-melting and kneading a styrene resin, introducing a blowing agent into the styrene resin under pressure and conducting extrusion foaming, wherein the blowing agent comprises mainly 40% by weight or more and 85% by weight or less, based on the whole amount of the blowing agent, of at least one ether selected from the group consisting of dimethyl ether, methyl ethyl ether and diethyl ether, and 15% by weight or more and 60% by weight or less, based on the whole amount of the blowing agent, of at least one saturated hydrocarbon selected from the group consisting of saturated hydrocarbons having 3 to 5 carbon atoms.

(11) The method for producing an extruded styrene resin foam as set forth in the preceding paragraph (10), wherein a weight ratio of the ether to the whole blowing agent is 50% by weight or more and 85% by weight or less and a weight ratio of the saturated hydrocarbon to the whole blowing agent is 15% by weight or more and 50% by weight or less.

(12) The method for producing an extruded styrene resin foam as set forth in the preceding paragraph (10), wherein a weight ratio of the ether to the whole blowing agent is 50% by weight or more and less than 70% by weight and a weight ratio of the saturated hydrocarbon to the whole blowing agent is more than 30% by weight and 50% by weight or less.

(13) The method for producing an extruded styrene resin foam as set forth in any one of the preceding paragraphs (10) to (12), wherein the extruded styrene resin foam has a cell anisotropic ratio k, which is defined by the formula:

$$k=a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfying the equation:

$$0.80 \leq k \leq 1.25$$

and an average cell size, a, in the thickness direction satisfying the relationship:
ti $0.24 \leq a \leq -1.1 \times k+1.62$.

(14) The method for producing an extruded styrene resin foam as set forth in the preceding paragraph (13), wherein the foam has a density of 26 to 35 kg/m³.

(15) The method for producing an extruded styrene resin foam as set forth in any one of the preceding paragraphs (10) to (14), wherein the cells constituting the foam comprise mainly smaller cells having a cell size of 0.25 mm or less and larger cells having a cell size of 0.3 to 1 mm, and the area of the smaller cells having a cell size of 0.25 mm or less accounts for 10 to 90% of a sectional area of the foam.

(16) The method for producing an extruded styrene resin foam as set forth in any one of the preceding paragraphs (10) to (13) and (15), wherein the foam has a density of 15 to 40 kg/m³.

(17) The method for producing an extruded styrene resin foam as set forth in any one of the preceding paragraphs (10) to (16), wherein the foam has a thermal conductivity of not more than 0.029 kcal/m·hr·° C.

(18) The method for producing an extruded styrene resin foam as set forth in the preceding paragraph (15), wherein 0.05 to 2 parts by weight of at least one water-absorbing material selected from the group consisting of a water-absorbing high molecular compound, inorganic powder having many hydroxyl groups on its surface and silicate powder, and 0.2 to 1.5 parts by weight of water are made to exist in 100 parts by weight of the styrene resin when performing the extrusion foaming.

The present invention enables to afford extruded styrene resin foams having good thermal insulation property and mechanical properties by using a permissible non-halogen blowing agent even without using any halogen-containing blowing agents such as fluorinated chlorinated hydrocarbons, fluorinated hydrocarbons and chlorinated hydrocarbons with attention to environmental problems.

That is, the invention uses a mixed blowing agent composed of at least one ether selected from the group consisting of dimethyl ether, methyl ethyl ether and diethyl ether and at least one saturated hydrocarbon selected from the group consisting of saturated hydrocarbons having 3 to 5 carbon atoms (propane, butane and pentane) as a blowing agent. Among these, it is preferable to use a mixed blowing agent composed of dimethyl ether and propane and/or butane. Other blowing agent, however, may be added unless the effect of the present invention is affected adversely. As the butane may be used n-butane, isobutane and mixtures thereof. Particularly, isobutane is preferred because of its low permeation rate through styrene resin.

As the ether used as the blowing agent in the present invention, one sort or two or more sorts of ether selected from the group consisting of dimethyl ether, methyl ethyl ether and diethyl ether can be employed. Among these, dimethyl ether is particularly preferred from the viewpoint of safety, foaming ability and the like. Hereinafter, the present invention will be described mainly by referring to the representative case where dimethyl ether is used as the ether.

In the present invention, the reason why dimethyl ether is particularly preferably used as a blowing agent is as follows. Dimethyl ether is not a material to adversely affect work environment. Furthermore, it is easily dissolved into a molten styrene resin in a extrusion system, and has a boiling point not higher than the ordinary temperature, and has good foaming ability. It is, therefore, effective in producing lightweight foams. Additionally, it serves as an easily permeable blowing agent and exhibits good effects on improvement in thermal insulation property and mechanical properties due to its effect on making cell size smaller. These are based on new knowledge found by the present inventors.

In the case of using a foam as a thermal insulating material, thermal conduction of the foam is effected by thermal conduction of solid cell membranes, thermal conduction and convection of a gas in cells, and thermal radiation between cell membranes. The thermal conductivity of the foam is determined by a total of these factors. Making cells smaller, namely, increasing shielding frequency of cell membranes against a heat flow has an effect on controlling thermal transfer due to radiation. Accordingly, it becomes effective on improvement of the thermal insulation property of the foam.

Furthermore, the effect of making cells smaller also improves the mechanical properties of the foam indirectly. In order to adjust a cell size, inorganic nucleating agents such as talc powder and calcium carbonate powder are generally used. Heretofore, making cells smaller has been effected by addition of a large quantity of such inorganic nucleating agent. In the present invention, however, it has been found that in the case of using dimethyl ether, making cells smaller can be effected by addition of no or a small amount of inorganic nucleating agent because dimethyl ether can effect on making cells smaller. For example, it is also possible to make little inorganic substance exist in a foam. This effect can improve a knife-cutting property of a foam which is required in the case where the foam is used as a core material of tatami mats.

The process of making a tatami containing a chemically manufactured foam as a core material is as follows. Tatamidoko (a body of tatami) is made by stitching the foam with straws or an insulation board. Tatamidoko is cut into a predetermined size and stitched with a surface material (tatami-omote) made of rush to provide the tatami. In this process, tatamidoko is cut into the predetermined size by mainly using a knife. In this step, it is essential that no cracking or chipping must occur and the cut surface has a good appearance, in other words, tatamidoko is required for a good knife-cutting property. According to the present invention, the knife-cutting property of the foam is improved.

Furthermore, the use of dimethyl ether can attain an appropriate escaping rate of gas from the foam after foaming as mentioned later, resulting in good dimensional stability of the foam.

A dimensional change of a foam prepared by foaming arises from a balance between a pressure of gas in cells and a strength of a cell membranes. Since the strength of the cell membrane is approximately determined by a density of the foam, it is desirable that the pressure in the cells is constant. The pressure in the cells is determined by the amount of the blowing agent remaining in the foam and the amount of the air entering the cells after foaming. The main reason why an easily permeable blowing agent and a hardly permeable blowing agent are used in combination as a volatile blowing agent lies in adjustment of the pressure of gas in the cells.

When dimethyl ether is used, since an escaping rate of dimethyl ether from the foam after foaming is approximately the same as an entering rate of air to the foam, the pressure of gas in cells does not change so much. Accordingly, the dimensional stability of the foam is good.

On the other hand, for example, although a blowing agent such as carbon dioxide is an easily permeable blowing agent, it has an insufficient solubility to a molten styrene resin and it is sometimes limited in its amount to be introduced into the resin under pressure. In addition, since such blowing agent has an extremely large escaping rate from the foam, a dimensional stability problem that shrinkage occurs immediately after extrusion may arise in the case of foams with a high expansion ratio. Thus that blowing agent tends to have various problems to be solved when it is used well.

Another reason why dimethyl ether is preferred is that it has a characteristic that, as described later, it can provide a thick foam without increasing a cell anisotropic ratio, namely, without deforming cells in comparison with methyl chloride which has a good compatibility with styrene resin and hitherto has been generally used as an easily permeable blowing agent.

In the case of obtaining a foam having a cell structure in which larger and smaller cells are present together as mentioned later, it is essential for the system to contain water which is necessary for forming the smaller cells. Since dimethyl ether has a good compatibility with water, a dispersibility of water in the extrusion system is improved. Thus extrusion stability is improved, and it is possible to increase the ratio of the area occupied by the smaller cells having a cell size of not more than 0.25 mm to a sectional area of the foam, whereby formation of a desirable cell structure becomes possible and the thermal insulation characteristic of the foam also becomes better.

The reason why the present invention uses saturated hydrocarbons having 3 to 5 carbon atoms as a blowing agent lies in that they have, for example, the following advantages in the case of heating, melting and kneading a resin using an extruder or the like:

(1) They have a relatively good solubility to the resin.
(2) They have a relatively small escaping rate in a gaseous state from the foam and they easily remain in the foam in a gaseous state for a relatively long period of time.
(3) A thermal conductivity of them in a gaseous state is lower than that of the air and they are effective in improving the thermal insulation property.

(4) They are more inexpensive.

In the case of the blowing agent mainly composed of dimethyl ether and at least one saturated hydrocarbon selected from the group consisting of saturated hydrocarbons having 3 to 5 carbon atoms according to the present invention, when the proportion of dimethyl ether is too much, the closed cell ratio tends to be decreased, resulting in lowered thermal insulation property. When the proportion of at least one saturated hydrocarbon selected from the group consisting of saturated hydrocarbons having 3 to 5 carbon atoms is too much, there appears a trend that insufficient dispersion of gas, variation of die pressure and the like occur due to the increase in ratio of a slightly soluble blowing agent to the resin, and foams tend not to be obtained stably. A trend that the obtained foam is poor in heat resistance also appears. From these viewpoints, a weight ratio of dimethyl ether to the whole blowing agent is preferably not less than 40%, more preferably not less than 50%, still more preferably not less than 55%, and is preferably not more than 85%, more preferably less than 80%, still more preferably less than 75%, still more preferably less than 70%. A weight ratio of the hydrocarbon to the whole blowing agent is preferably not less than 15%, more preferably more than 20%, still more preferably more than 25%, still more preferably more than 30%, and is preferably not more than 60%, more preferably not more than 50%, still more preferably not more than 45%.

Particularly, the blowing agent to be used in the present invention is preferably one which contains not less than 40% and not more than 85% of dimethyl ether and not less than 15% and not more than 60% of the hydrocarbon based on the whole amount of the blowing agent, more preferably one which contains not less than 50% and not more than 85% of dimethyl ether and not less than 15% and not more than 50% of the hydrocarbon based on the whole amount of the blowing agent, still more preferably one which contains not less than 50% and less than 80% of dimethyl ether and more than 20% and not more than 50% of the hydrocarbon based on the whole amount of the blowing agent, still more preferably one which contains not less than 50% and less than 75% of dimethyl ether and more than 25% and not more than 50% of the hydrocarbon based on the whole amount of the blowing agent, still more preferably one which contains not less than 50% and less than 70% of dimethyl ether and more than 30% and not more than 50% of the hydrocarbon based on the whole amount of the blowing agent. Furthermore, in the case of placing importance particularly on heat resistance and dimensional stability of a foam to be obtained as well as its thermal insulation property, and especially in the case of requiring a highly efficient thermal insulation property due to the cell structure formed of larger and smaller cells as described later, a blowing agent which mainly contains not less than 40% and less than 70% of dimethyl ether and more than 30% and not more than 60% of the hydrocarbon, based on the whole blowing agent. More preferred is one which contains not less than 50% and less than 70% of dimethyl ether and more than 30% and not more than 50% of the hydrocarbon, based on the whole blowing agent. On the other hand, in the case of requiring a foam having a highly efficient thermal insulation property imparted by provision of a cell anisotropic ratio and an average cell size in the thickness direction, the blowing agent preferably is one which mainly contains not less than 55% and not more than 85% of dimethyl ether and not less than 15% and not more than 45% of the hydrocarbon, based on the whole blowing agent. More preferred is one which mainly contains not less than 55% and less than 70% of dimethyl ether and more than 30% and not more than 45% of the hydrocarbon, based on the whole blowing agent.

A density of the foam according to the present invention is preferably 15 to 40 kg/m$^3$, more preferably 20 to 35 kg/m$^3$, and still more preferably 26 to 35 kg/m$^3$ in order to provide a lightweight foam having excellent thermal insulation property and strength. A foam density of less than 15 kg/m$^3$ tends to result in decrease in both thermal insulation property and strength. On the other hand, a density of more than 40 kg/m$^3$ are not preferable in view of a light weight and a price.

Although the foam of the present invention preferably is a board-like foam for thermal insulators, its thickness is not particularly limited. It is usually from 15 mm to 150 mm, preferably from 20 mm to 100 mm.

Next, enhancing the thermal insulation characteristic by a cell structure will be described.

The relationship between the thermal insulation property which is the most important physical property for thermal insulating materials and the foam is explained. It has generally been known that thermal conduction characteristic of a foam having a closed cell structure depends upon characteristics such as a thermal conductivity of cell membranes, a thermal conductivity of a gas which exists in the cells and thermal conduction by convection of the gas and thermal conduction by radiation in the cells, and that when the cells has a cell size of not more than 3 mm, the amount of heat which is transferred by the convection of the gas in the cells is very small and can be disregarded.

The conventional general technical means for providing a foam with a highly efficient thermal insulation property is to decrease a thermal conductivity of the gas in cells by making a gas with a low thermal conductivity like flons to exist together with the air, thereby decreasing a thermal conductivity of the foam.

An example of a styrene resin extruded foam will be concretely described.

The polystyrene foams by an extrusion method provided in JIS A 9511 are classified into Classes B1, B2 and B3 according to thermal insulation property. Heretofore, particularly in the case of highly efficient thermal insulation grades such as Classes B2 and B3, it has been difficult to attain a highly efficient thermal insulation property required without using a technical means in which flon is allowed to remain in the cells in order to enhance the thermal insulation characteristic.

Figure 1:
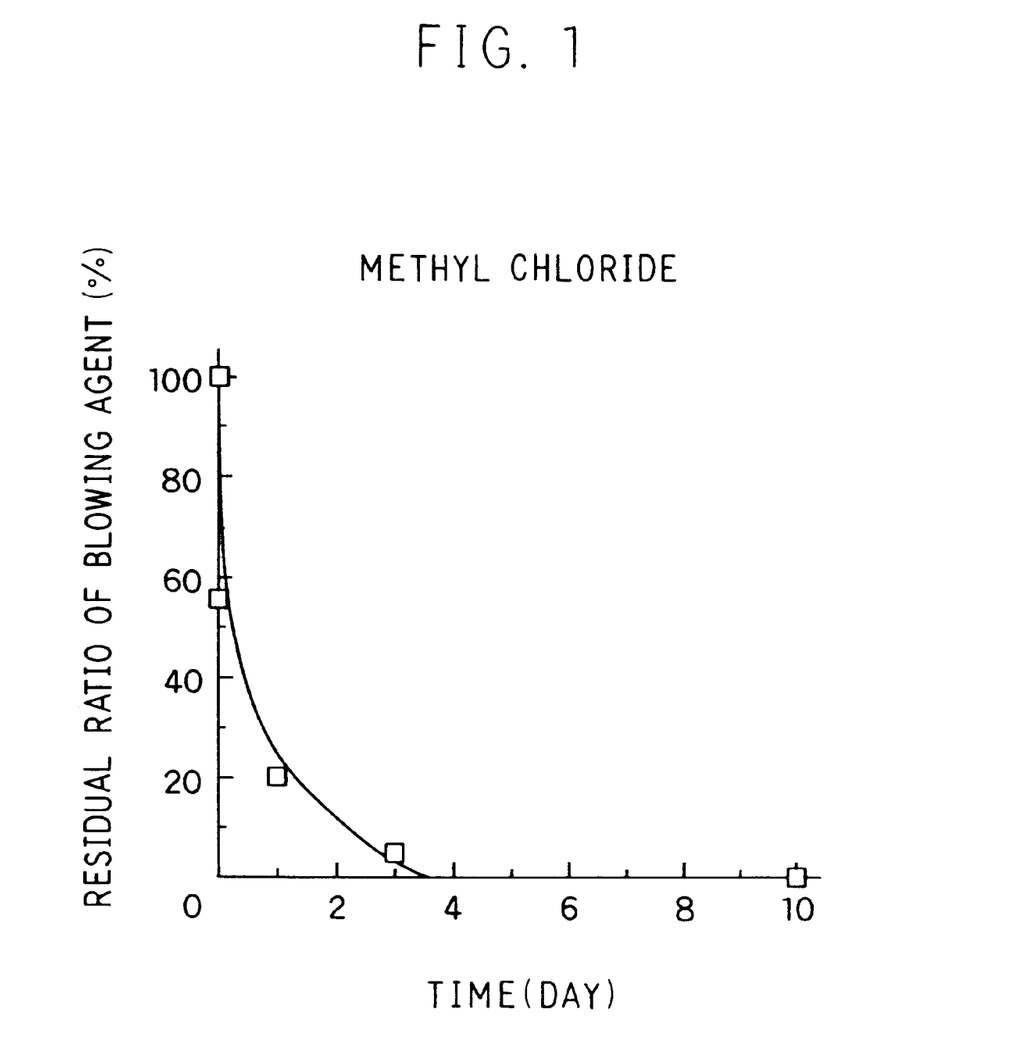
FIG. 1 is a graph illustrating the change of a residual ratio of the blowing agent in cells of the extruded polystyrene foam obtained by using methyl chloride as a blowing agent with the passage of time.
Figure 2:
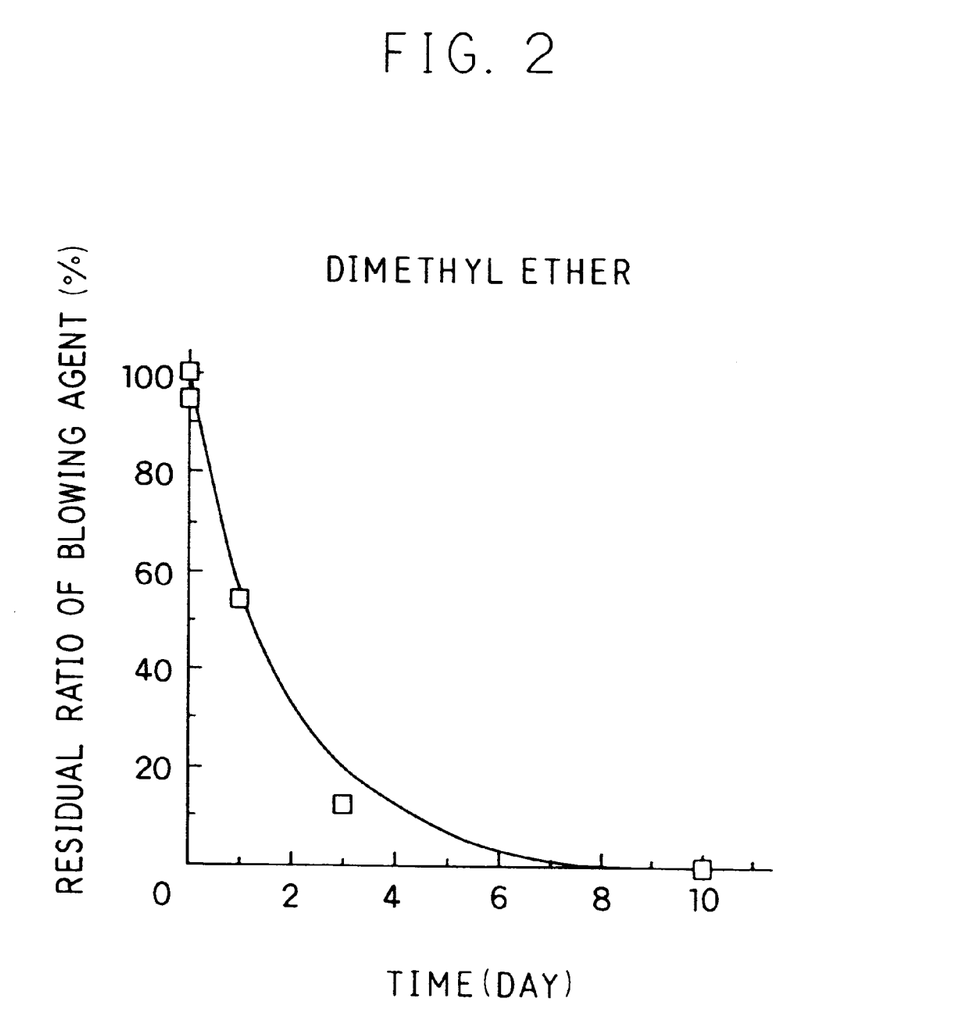
FIG. 2 is a graph illustrating the change of a residual ratio of the blowing agent in cells of the extruded polystyrene foam obtained by using dimethyl ether as a blowing agent with passage of time.
Figure 3:
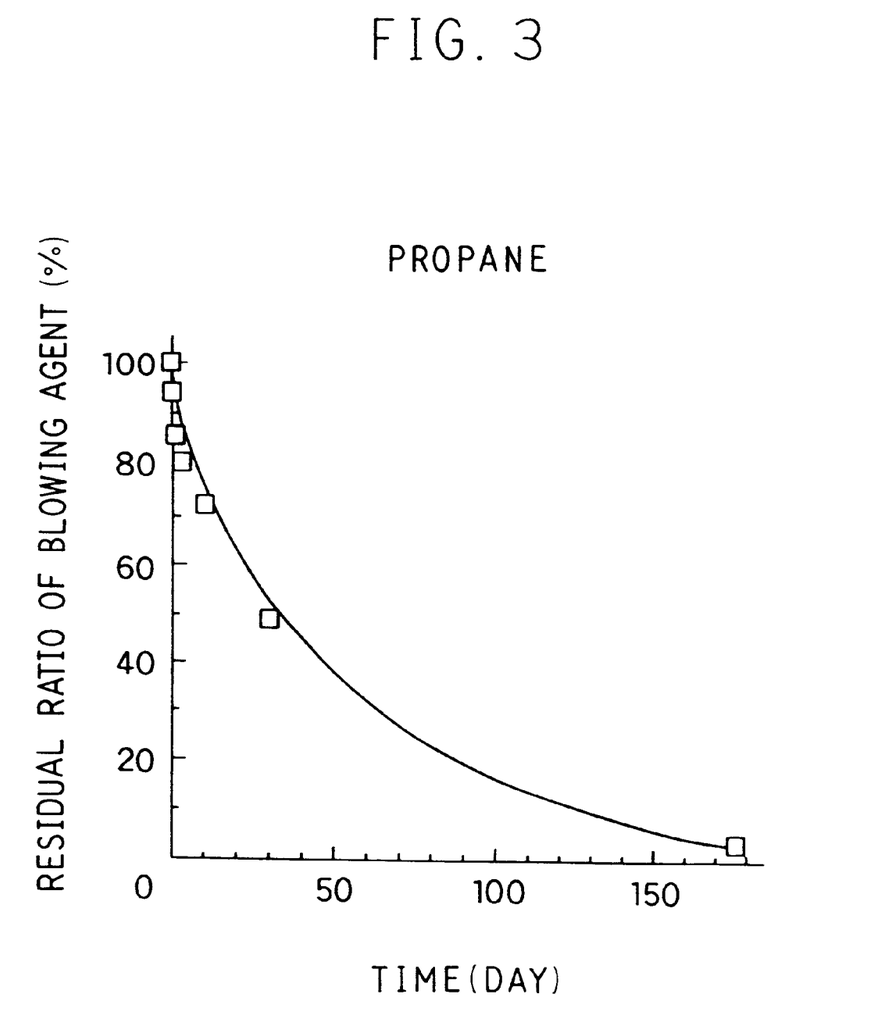
FIG. 3 is a graph illustrating the change of a residual ratio of the blowing agent in cells of the extruded polystyrene foam obtained by using propane as a blowing agent with the passage of time.
Figure 4:
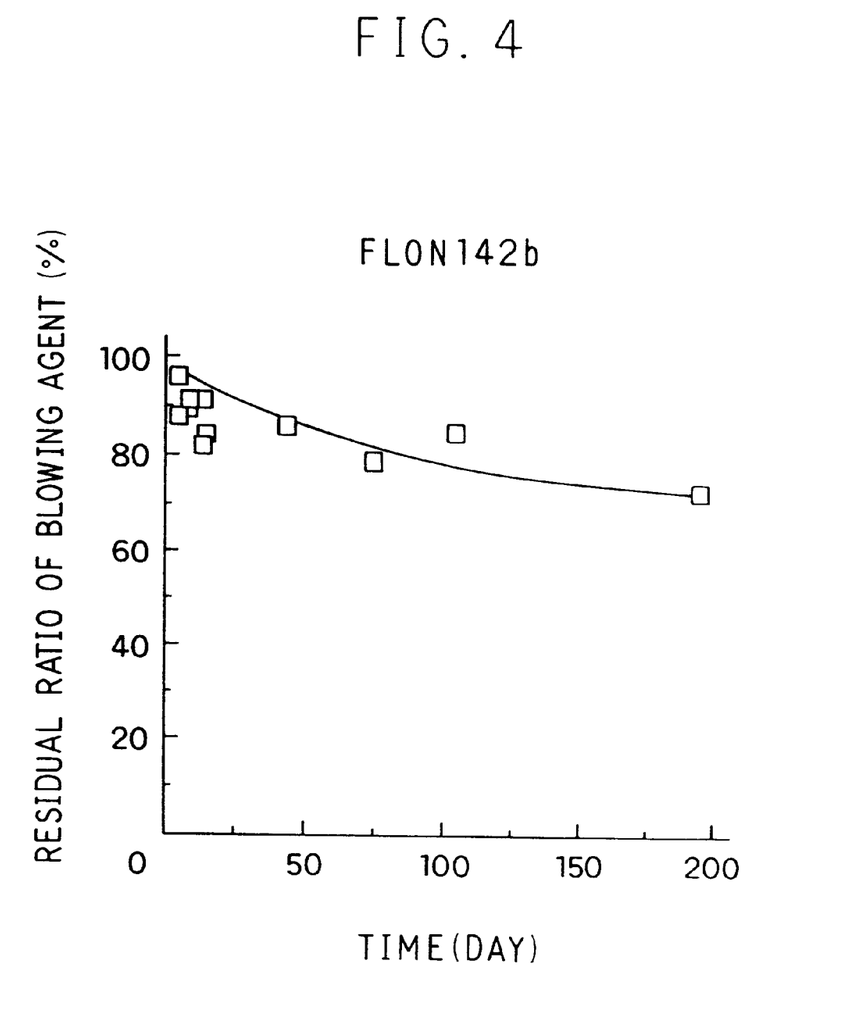
FIG. 4 is a graph illustrating the change of a residual ratio of the blowing agent in cells of the extruded polystyrene foam obtained by using flon 142b as a blowing agent with the passage of time.

FIGS. 1 to 4 illustrate examples of changes, with the passage of time, of a residual ratio of a blowing agent contained in cells of each of polystyrene extruded foams obtained by using various blowing agents. All is data on foams having a density of 30 kg/m$^3$ and a thickness of 25 mm. Methyl chloride, dimethyl ether and propane, respectively, take 4 days, 10 days and 6 months to approximately completely disappear from the cells. On the other hand, about 70% of the amount of flon 142$b$ added remains in the cells even after the passage of 6 months. From the viewpoint of such characteristics of the gases, flon 142$b$ is the blowing agent which is used most widely today in the production of the highly efficient thermal insulation grades. There, however, is a plan for converting the flon to other blowing agents in 2010 in consideration of the environmental problem.

Accordingly, the present inventors have attempted to attain the thermal insulation characteristic of Class B2 without using such flon gas. As a technical means for this, they tried to compensate for the reduction in thermal conductivity of a gas in the cells achieved by use of flon gas with the reduction in thermal conduction caused by radiation.

It has been generally known that the thermal conduction caused by radiation remarkably depends on a cell structure and that the thermal insulation property is improved as the cell size becomes smaller. That is because, in the case of foams having the same thickness and the same density, the shielding frequency of radiation increases and the thermal conduction caused by radiation is reduced as the cell size becomes smaller.

The relationship between a cell structure and thermal insulation characteristic has been studied by making extruded foams having various cell structures using a blowing agent which does not remain in cells for a long period of time. As for the cell size, not only that in the thickness direction of a product but also that in the transverse direction and that in the longitudinal direction have been considered, and the cell structure has been considered as a whole. In this study, it has been found that even if foams have the same cell size in their thickness direction, namely, in the heat flow direction, the thermal insulation property changes among the foams depending on their cell anisotropic ratios and that the thermal insulation property is improved as the cell anisotropic ratio becomes smaller. The cell anisotropic ratio k is a value represented by the formula:

$$k=a/(a\times b\times c)^{1/3}$$

wherein a (mm) represents an average cell size in the thickness direction of a product, b (mm) represents an average cell size in the transverse direction of the product and c (mm) represents an average cell size in the longitudinal direction of the product. This cell anisotropic ratio k indicates a ratio of the cell size in the thickness direction to the average cell size as the structural body calculated from cell sizes in all of the directions, namely, a ratio of orientation of the cells.

This fact means that the thermal conduction caused by radiation is correlated with two factors of the absolute value of the cell size in the thickness direction and the cell anisotropic ratio.

Although the present inventors have not provided any clear, logical explanation of why among foams having the same cell size in the thickness direction, a foam having a reduced cell anisotropic ratio is improved in thermal insulation property, they assume that this is because cell membranes which accept and release heat caused by radiation become thick and, hence, transmission of thermal rays decreases.

As a result of such studies, the inventors have succeeded in obtaining a foam having a thermal conductivity of not more than 0.029 kcal/m·hr·° C., i.e., the thermal insulation property of Class B2 provided in JIS A 9511 by making the foam to have a cell structure in which a cell anisotropic ratio k satisfies the equation: $k\leq 1.25$, and the average cell size in the thickness direction, a (mm), satisfies the relationship:

$$0.24\leq a\leq -1.1\times k+1.62$$

without relying on the remaining blowing agent.

Since ranges of the preceding two factors are correlated with each other, they are preferably determined as follows.

When the cell anisotropic ratio is more than 1.25, there is a trend that the thermal insulation property decreases and thermal conductivity of not more than 0.029 kcal/m·hr·° C. is difficult to be achieved.

As for the lower limit of the range of the average cell size in the thickness direction a (mm), when a is less than 0.24 mm, the cell anisotropic ratio becomes extremely large and it is liable to become difficult to form a foam having k of not more than 1.25 as the thickness of the product increases. When the average cell size in the thickness direction a (mm) is less than the lower limit, the cell anisotropic ratio sometimes becomes more than 1.25 even if, for example, the thickness of the product is about 40 to 50 mm. It, therefore, becomes difficult to meet the request for easily obtaining, on an industrial scale, products with good thermal insulation property with satisfying a wide thickness range industrially required.

As for the upper limit of the average cell size in the thickness direction a (mm), although the thermal insulation property decreases as the average cell size in the thickness direction a (mm) becomes larger, there is a range where the average cell size in the thickness direction a (mm) depends on a cell anisotropic ratio because the average cell size in the thickness direction is correlated to the cell anisotropic ratio.

In the case of the relationship of $a > -1.1\times k+1.62$, the effect of increasing the thermal conductivity caused by the enlarged average cell size in the thickness direction a (mm) is greater than the effect of reducing the thermal conductivity caused by the reduction in cell anisotropic ratio. It, therefore, becomes difficult to attain thermal conductivity of a foam of not more than 0.029 kcal/m·hr·° C.

On the other hand, in the case of using a foam as a thermal insulator, mechanical property, particularly a compressive strength, is one of important physical properties. Although the study on the relationship between the thermal insulation property and the cell structure is described above, the relationship between the compressive strength and the cell structure has also been studied.

In general, when a styrene resin foam is used as a thermal insulating construction material, it is supposed that the foam preferably has a compressive strength of approximately not less than 2 kg/cm$^2$ as a practical performance. This is for the purpose of, for example, preventing the foam from buckling when it is adhered to a panel in the case of a use wherein the foam is used in a form integrated with the panel. Alternatively, that is for the purpose of preventing the foam from crushing caused by local compression by furniture placed in the case of a use of the foam as a core material for tatami mats.

The compressive strength of the foam is strongly dominated by the strength of the material, the density of the foam, and the cell structure. In the case of foams with a high expansion ratio, for example, a density of about 30 kg/m$^3$, which is in the range encompassed by the present invention, it is supposed that a cell structure, particularly orientation of cells, makes effect strongly on the compressive strength.

As a result of the study on the relationship between the cell structure and the compressive strength, the inventors have found that when a density is constant, the compressive strength increases as the cell anisotropic ratio becomes larger, and on the contrary, the compressive strength decreases as the cell anisotropic ratio becomes smaller. The inventors then have quantified that relationship.

Consequently, they have found that it is favorable that when the cell anisotropic ratio k is $0.80\leq k$, a compressive strength of 2 kg/cm$^2$ which is supposed to be desirable can be achieved. In this case, however, it is preferred that the density of the foam is not less than 26 kg/m$^3$.

Accordingly, considering the relationship between the cell structure and the thermal insulation property and the relationship between the cell structure and the compressive strength together, it is preferable to specify the cell size so that the cell anisotropic ratio k is $0.80\leq k\leq 1.25$, preferably $0.90 \leq k \leq 1.2$, and at the same time, the average cell size in the thickness direction a (mm) satisfies the relationship:

$$0.24 \leq a \leq -1.1 \times k + 1.62,$$

preferably $0.30 \leq a \leq -1.1 \times k + 1.62$, and further to specify the density of the foam to fall within a range of 26 to 35 kg/m³ as also described later because the foam can permanently maintain the thermal insulation property of Class B2 provided in JIS A 9511. In addition, when the aforesaid conditions are satisfied, the foam can also satisfy the compressive strength property required for construction materials, which is extremely desirable. In other words, the foam having the aforesaid specific cell structure can maintain a thermal conductivity of not more than 0.029 kcal/m·hr·° C. even if a blowing agent having a low thermal conductivity escapes and the foam is in a state where the cells are substantially filled with the air. Additionally, the foam can possess a good compressive strength. The state where the cells are substantially filled with the air, means a state where a molar fraction of a blowing agent other than air in the gas contained in the cells is not more than 10%.

A distribution condition of the aforesaid specific cell structure in a foam is not particularly limited. It may be distributed uniformly in the thickness direction of the foam. Alternatively, it may be distributed with certain regularity in the thickness direction of the foam. The distribution condition of the cell structure in a foam is much influenced by a method of obtaining products from an extruded foam. The method of obtaining products from an extruded foam includes the following two methods. The first is a method in which a thick foam is extruded, the skin of the foam is removed, and the foam is cut in the transverse and longitudinal directions into a predetermined size, and in a later step, the foam is sliced into a thickness corresponding to each of products having an individual dimension (for example, about 20 to 100 mm; particularly in many cases, not less than about 25 mm and less than about 60 mm; most generally, about 25 to 50 mm) to provide products. Another method is one in which a foam having a thickness corresponding to the thickness of a product is extruded, the skin of the foam is removed, and the foam is cut in the transverse and longitudinal directions into a predetermined size to provide products. When producing products with a skin, a foam having a thickness corresponding to the thickness of a product is extruded, and it is cut into predetermined width and length, without removing the skin, to provide a product.

The cell structure of the product obtained in the former method is relatively uniformly distributed in the thickness direction of the foam. The cell structure of the product obtained in the latter method tends to be distributed with a regularity symmetrically with respect to the center of the foam in the thickness direction. The cell structure of the present invention may be applied to both of the distribution conditions.

The performance due to the aforesaid specific cell structure can be preferably attained in the case of a foam having a density ranging from 26 to 35 kg/m³. When a density of the foam is less than 26 kg/m³, since the amount of the resin per unit volume may be below the amount required in order to prevent thermal rays from transmitting, there is a tendency that it becomes difficult to obtain desired low thermal conductivity. Furthermore, there also is a tendency that the cell membrane becomes thin, the strength decreases and it becomes difficult to obtain desired compressive strength. In the case of the density of the foam being more than 35 kg/m³, since the amount of the heat conducted by the thermal conduction of the cell membrane may increase, there also is a tendency that it becomes difficult to obtain desired thermal conductivity.

A cell structure which contributes to enhancing the thermal insulation property may be one in which larger and smaller cells coexist.

Although a foam having the cell structure in which the larger and smaller cells coexist may be one in which cells having a cell size of not more than about 0.25 mm and cells having a cell size of about 0.3 to 1 mm, respectively, have their own peaks in the cell size distribution, it is preferable that the number of the cells having a cell size between these two cell size ranges is few. For example, the content of cells having a cell size of more than about 0.25 mm and less than 0.3 mm and cells having a cell size of more than 1 mm is preferably about less than 20%, more preferably about less than 10% in terms of the ratio of the area occupied by such cells to a sectional area of the foam.

The foam having the cell structure in which the larger cells and smaller cells coexist, as mentioned above, is composed mainly of the cells having a cell size of not more than 0.25 mm and cells having a cell size of about 0.3 to 1 mm wherein the cells having a cell size of not more than 0.25 mm and the cells having a cell size of about 0.3 to 1 mm do not form layers. The foam has either a so-called sea-island structure in which the cells having a cell size of about 0.3 to 1 mm mainly form the islands and the cells having a cell size of not more than about 0.25 mm form the sea or a structure in which the cells having a cell size of not more than about 0.25 mm are dispersed so that these cells directly surround the cells having a cell size of about 0.3 to 1 mm through their own cell membranes.

The foam having such a cell structure in which larger cells and smaller cells coexist is one in which cells having a cell size of not more than about 0.25 mm and cells having a cell size of about 0.3 to 1 mm are dispersed so as to form mainly a sea-island structure, and it is assumed that the fine cells of not more than about 0.25 mm serve to decrease the thermal conductivity and the cells having a cell size of about 0.3 to 1 mm serve to secure mechanical strengths such as bending strength. Furthermore, from the viewpoint of imparting a low thermal conductivity and an adequate bending strength to the foam of the present invention, it is more preferable that the cells having a cell size of not more than about 0.25 mm and the cells having a cell size of about 0.3 to 1 mm are dispersed as uniformly as possible rather than being dispersed inhomogeneously.

As described above, the cell size of the smaller cells in the foam body having the cell structure wherein the larger and smaller cells coexist is preferably not more than about 0.25 mm. When the cell size of the smaller cells is more than about 0.25 mm, the thermal conductivity of the foam tends to be increased. The larger cells preferably have a cell size of about 0.4 to 0.7 mm.

As for the proportions of the smaller cells having a cell size of not more than about 0.25 mm and the larger cells having a cell size of about 0.3 to 1 mm, because too small ratio of the area occupied by cells having a cell size of not more than about 0.25 mm to a sectional area of the foam makes a tendency that the thermal conductivity becomes larger, the ratio is preferably not less than about 10%, more preferably not less than about 20%, still more preferably not less than about 30%. On the other hand, when that ratio is too large, there is a tendency that mechanical strength such as bending strength decreases. That ratio, therefore, is preferably not more than about 90%, more preferably not more than about 80%.

In the present invention, it is more preferable that an embodiment specifying the cell anisotropic ratio and the average cell size in the thickness direction is combined with an embodiment specifying the cell structure to one in which larger and smaller cells coexist. This embodiment has an advantage that good thermal insulation property, namely the thermal insulation property of not more than 0.029 kcal/m·hr·°C. which is the thermal insulation characteristic of Class B2 provided in JIS A 9511 can be easily attained.

Styrene resins usable in the present invention include polystyrene as a typical example, and for example, copolymers of styrene and a monomer which is copolymerizable with styrene such as α-methylstyrene, maleic anhydride and acrylonitrile, resins prepared by blending polystyrene with styrene/butadiene rubber or the like.

In the present invention, the styrene resin may be incorporated with a nucleating agent, additives which are called a water-absorbing material in the present invention such as inorganic powder having many hydroxyl groups on its surface and a water-absorbing high molecular, and the like, as demanded.

The nucleating agents include conventional ones which have been employed in extrusion foaming. Representative examples of such nucleating agents include talc powder and calcium carbonate powder. These nucleating agents may be used either singly or in combination with two or more of them. Such a nucleating agent has a particle size of usually 3 to 100 μm, preferably 5 to 20 μm. The nucleating agent is used in order mainly to adjust a cell size of a foam to a value in the range of 0.2 to 1 mm. The amount of such a nucleating agent is adjusted to be preferably 0.01 to 5 parts (parts by weight, hereinafter the same), more preferably 0.01 to 1.5 parts, still more preferably 0.01 to 1 part, still more preferably 0.05 to 0.5 part, still more preferably 0.05 to 0.3 part, based on 100 parts of a styrene resin. When the amount of the nucleating agent is less than the preceding range, the effect of adding the nucleating agent is not exhibited sufficiently and the cell size tends to become too large or uneven. On the other hand, when the amount of the nucleating agent is more than that range, there is a tendency that a desired density is difficult to be achieved though the cell size becomes fine.

In the present invention, in addition to the aforesaid nucleating agent, inorganic powder having many hydroxyl groups on its surface and a water-absorbing high molecular compound, other additives which have been generally used, including flame retardants such as hexabromocyclododecane, antioxidants such as polymer-type hindered phenol compounds, lubricants such as barium stearate and magnesium stearate, may be incorporated in an appropriately adjusted amount.

The foam of the present invention can be obtained by heat-melting and kneading the foregoing styrene resin and additives in predetermined amounts, and introducing under pressure or adding the preceding volatile blowing agent, followed by extrusion foaming.

The heating temperature, the melting and kneading time and the means for melting and kneading to be adopted for heat-melting and kneading the styrene resin and the additives have no particular limitations. The heating temperature may be not lower than a temperature at which the styrene resin melts, and usually is about 150 to 250° C. The melting and kneading time varies depending upon an extrusion amount per unit time, melting and kneading means and the like and can not absolutely be decided. However, a time necessary for the styrene resin and the additives to be dispersed uniformly is usually chosen. Although the melting and kneading means may be, for example, an extruder of screw type, it has no limitations as long as it is used for usual extrusion foaming.

As a method of expansion forming can be employed a general method in which a foam obtained by pressure release from a slit die is shaped into a board-like foam with a large section area by using a forming die, a forming roll and the like which are mounted in contact with the slit die.

The amount of the aforesaid volatile blowing agent used is preferably adjusted to not less than about 0.1 mole, preferably not less than about 0.15 mole, based on 100 g of the styrene resin because the use of too small amount of the blowing agent tends to decrease the expansion ratio of the styrene resin foam to be obtained and also to increase the shrinkage of the foam after extrusion. On the other hand, the use of too large amount of the blowing agent causes a tendency that foams can not be produced stably or that the dimensional stability of the foam decreases because a mixture is extruded with the blowing agent being insufficiently dissolved into the resin. The amount of the blowing agent used, therefore, is preferably adjusted to not more than about 0.4 mole, more preferably about not more than about 0.3 mole, still more preferably not more than about 0.25 mole, based on 100 g of the styrene resin. When the amount of the blowing agent used relative to the styrene resin is indicated in terms of the number of parts (parts by weight), for the same reasons as described above, the amount of the blowing agent is preferably adjusted to not less than about 4.5 parts, more preferably not less than about 6.5 parts, and still more preferably not less than about 7.0 parts, based on the 100 parts by weight of the styrene resin, and, on the other hand, it is preferably adjusted to not more than 18 parts, more preferably not more than 14 parts, still more preferably not more than 12 parts, especially not more than 9 parts, based on 100 parts of the styrene resin.

After introducing under pressure or adding the volatile blowing agent, a foam which contains cells having an average cell size of about 0.2 to 1 mm, usually about 0.3 to 0.8 mm is produced by using a conventional method such as extruding the mixture to a lower pressure region such as a region at atmospheric pressure through a foaming apparatus such as a slit die.

In the present invention, the production of a foam having a cell structure in which mainly smaller cells having a cell size of not more than about 0.25 mm and larger cells having a cell size of about 0.3 to 1 mm coexist requires the aforesaid styrene resin and volatile blowing agent and water. In the case where in addition to the aforesaid nucleating agent, the water-absorbing material in the present invention, namely, at least one material selected from the group consisting of the inorganic powder having many hydroxyl groups on its surface, the water-absorbing high molecular compound and the silicate powder is made to be present together with water, a foam in which the smaller and larger cells coexist can be successfully produced.

Since dimethyl ether has a better compatibility with water than that of other blowing agents such as methyl chloride, as mentioned above, it enables water to be dispersed more uniformly in combination use of the water-absorbing material, which enables a foam in which the smaller and larger cells coexist to be produced more easily than prior art. Thus using dimethyl ether is extremely preferred in the present invention.

The water to be used has no particular limitations, and may be, for example, pure water. Both in the case where the amount of water to be introduced under pressure or added to the heat-melted and kneaded mixture is too small and in the case where the amount of water is too much, there is a tendency that it is difficult to produce a foam having a cell structure in which cells having a cell size of not more about 0.25 mm and cells having a cell size of about 0.3 to 1 mm are dispersed in a sea-island state through cell membranes which can improve the physical properties of styrene resin foams such as thermal conductivity and bending flexibility. Accordingly, it is preferred that the amount of water used is preferably adjusted to not less than about 0.2 part and not more than 1.5 parts, more preferably not less than 0.3 part and not more than 0.7 part, on the basis of 100 parts of the styrene resin. The amount of water in the preceding range can provide a foam with a good cell structure which the present invention intends to produce.

The volatile blowing agent and water may be introduced under pressure or added to the heat-melted and kneaded mixture either concurrently or separately. The present invention is not restricted by the manner of introducing under pressure or adding the blowing agent and water.

In order to make water exist in the extrusion system, it is preferred to make the inorganic powder having many hydroxyl group on its surface, the water-absorbing high molecular compound or the silicate powder coexist as mentioned above, thereby making water disperse in the molten styrene resin uniformly. In this case, a part or the whole of the water to be introduced may be introduced under pressure or added to the heat-melted and kneaded mixture in a state where it is adsorbed on or absorbed by at least one water-absorbing material selected from the group consisting of the inorganic powder, the water-absorbing high molecular compound and the silicate powder.

Representative examples of the aforesaid inorganic powder having many hydroxyl groups on its surface include anhydrous silica having silanol groups on the surface such as AEROSIL (an average particle size: $12 \times 10^{-3}$ $\mu$m) manufactured by Nippon Aerosil Co., Ltd. Such inorganic powders may be used either singly or in combination of two or more of them. It is preferable that the inorganic powder having many hydroxyl groups on its surface usually has an average particle size of $5 \times 10^{-3}$ to $30 \times 10^{-3}$ $\mu$m, particularly $5 \times 10^{-3}$ to $20 \times 10^{-3}$ $\mu$m. The mixing amount of the inorganic powder having many hydroxyl groups on its surface is preferably adjusted so as to become 0.05 to 2 parts, more preferably 0.1 to 0.5 part, based on 100 parts of the styrene resin. When the mixing amount of the inorganic powder is less than the foregoing range, there is a tendency that the number of the formed fine cells (smaller cells) decreases. On the other hand, when exceeding that range, the fine cells tend to become hard to be formed.

Representative examples of the water-absorbing high molecular compound include polyacrylic acid salt resins such as Aqualic CA ML-10 (an average particle size: 10 $\mu$m) manufactured by Nippon Shokubai Co., Ltd. These may be used either singly or as mixtures of two or more of them. The average particle size of the water-absorbing high molecular compound is usually 5 to 70 $\mu$m, preferably 5 to 20 $\mu$m. The mixing amount of the water-absorbing high molecular compound is adjusted so as to become 0.05 to 2 parts, particularly 0.1 to 0.8 part, based on 100 parts of the styrene resin. When the mixing amount of the water-absorbing high molecular compound is less than the foregoing range, there is a tendency that the number of the formed fine cells decreases. On the other hand, when exceeding that range, the fine cells tend to become hard to be formed.

Representative examples of the silicate powder include magnesium silicate such as Laponite manufactured by Nippon Silica Co., Ltd. These silicate powder may be used either singly or as mixtures of two or more of them. The mixing amount of the silicate powder is adjusted so as to become 0.05 to 2 parts, particularly 0.1 to 0.8 part, based on 100 parts of the styrene resin. When the mixing amount of the silicate powder is less than the foregoing range, there is a tendency that the number of the formed fine cells decreases. On the other hand, when exceeding that range, the fine cells tend to become hard to be formed.

The pressure applied when the aforesaid volatile blowing agent and water is introduced to the heat-melted and kneaded mixture under pressure has no limitations. It is essentially only that those agents can be introduced at a pressure higher than the inner pressure of the extruder. The heat-melted and kneaded mixture to which the volatile blowing agent and a predetermined amount of water have been introduced under pressure or added, is subsequently extruded to a lower pressure region such as a region at an atmospheric pressure through a conventional foaming apparatus such as a slit die. Thus extrusion the mixture to the lower pressure region provides a styrene resin foam mainly having cells having a cell size of not more than about 0.25 mm and cells having a cell size of about 0.3 to 1 mm.

BEST MODE FOR CARRYING OUT THE INVENTION

The styrene resin extruded foam and the method for the production of the same according to the present invention will be further explained in detail based on Examples. However, the invention is not limited only to the Examples.

In the following description, "part" means "part by weight." Additionally, "n-butane" and "i-butane" represent "normal butane" and "isobutane," respectively. "Butane" represents, for example, an industrial butane composed of about 70% by weight of n-butane and about 30% by weight of i-butane. In each Table, the total amount of blowing agents introduced under pressure, the amount of each blowing agent introduced under pressure, and the amount of nucleating agent are indicated by using the number of parts relative to 100 parts of the polystyrene resin. The ratio of the amount of each blowing agent to the total amount of the blowing agents is represented by using "% by weight".

As physical properties and characteristics of the foams obtained, a foam density, an expansion ratio, a closed cell ratio, an average cell size, an average cell size in each direction, a cell anisotropic ratio, a smaller cell occupying area ratio, a foam thermal conductivity, a foam compressive strength, a foam flammability, heat resistance, dimensional stability, corrosion resistance, environmental compatibility and knife cutting property were determined according to the following methods. The foam density, expansion ratio, closed cell ratio, average cell size, average cell size in each direction, cell anisotropic ratio, smaller cell occupying area ratio, foam compressive strength and foam flammability are expressed by data detected 7 days after the production of the foams. The foam thermal conductivity is expressed by the data detected 7 days after the production of the foams and the data detected 3 months after the production of foams when almost no changes in thermal conductivity with time can be observed and the value becomes stable.

[1] Foam Density

The foam density was determined using the following formula:

$$\text{Foam density (kg/m}^3\text{)} = \text{Foam weight/Foam volume}$$

The foam volume was determined by an immersion-in-water method.

[2] Expansion Ratio

The expansion ratio was determined using the following formula with the assumption that the density of the styrene resin used is approximately 1050 (kg/m$^3$):

Expansion ratio (times)=1050/Foam density (kg/m$^3$)

[3] Closed Cell Ratio of Foam

The closed cell ratio of a foam was determined according to ASTM D-2856 by using a multi-pycnometer (product name, manufactured by Yuasa Ionics Co., Ltd.)

[4] Average Cell Size

An appropriate part of the section (longitudinal section) obtained by cutting a foam vertically (in the thickness direction) along its longitudinal direction was sampled. The part was photographed at 30 magnification by using a scanning electron microscope (manufactured by Hitachi Ltd., model S-450). On the photograph was placed an OHP sheet onto which the parts corresponding to cells were copied by filling them with a black ink (a first treatment). The average cell size was determined by treating the image subjected to the first treatment with an image processing apparatus (manufactured by PIAS Co., Ltd., model: PIAS-II).

[5] Average Cell Size in Each Direction (Thickness Direction, Transverse Direction and Longitudinal Direction)

Appropriate parts were sampled from the section (hereinafter, referred to as a cross section) obtained by cutting a foam vertically (in the thickness direction) along the transverse direction, and the section (hereinafter, referred to as a longitudinal section) obtained by cutting the foam vertically (in the thickness direction) along the longitudinal direction. These parts were photographed at 20 magnification by using the scanning electron microscope (manufactured by Hitachi Ltd., model S-450). From these photographs were determined the average cell size in the thickness direction a (mm), the average cell size in the transverse direction b (mm) and the average cell size in the longitudinal direction c (mm) according to ASTM D-3576. The actual size of the part photographed was about 5 mm×5 mm. The average cell size in the thickness direction a (mm) was determined from both the cross section and the longitudinal section. Sampling may be done anywhere in a foam except for the edge of the foam which has an irregular cell structure. In this measurement, a foam (thickness: 20 to 100 mm; width: 910 mm) was sampled at three to five points symmetrically relative to the center in its thickness at the distance, 100 mm from the edge of the foam in the transverse direction. The preceding average cell size in the thickness direction a (mm), average cell size in the transverse direction b (mm) and average cell size in the longitudinal direction c (mm) are each the average of the respective values obtained at the parts sampled.

[6] Cell Anisotropic Ratio

Using the previously determined average cell size in the thickness direction a (mm), average cell size in the transverse direction b (mm) and average cell size in the longitudinal direction c (mm), the cell anisotropic ratio was determined from the formula:

$$k=a/(a \times b \times c)^{1/3}$$

[7] Smaller Cell Occupying Area Ratio

The ratio of the area occupied by cells having a cell size of not more than 0.25 mm to the area of a section of a foam was determined as follows. Here, the cell having a cell size of not more than 0.25 mm means that the diameter of a circle having the same area as the sectional area of the cell is not more than 0.25 mm.

(1) A longitudinal section of a foam is photographed at 30 magnification by using the scanning electron microscope (manufactured by Hitachi Ltd., model S-450).

(2) On the photograph is placed an OHP sheet onto which are copied the parts corresponding to cells having a cell size in the thickness direction of more than 7.5 mm (which corresponds to cells having an actual cell size of more than 0.25 mm) by filling them with a black ink (a first treatment).

(3) The image subjected to the first treatment is read by an image processing apparatus (manufactured by PIAS Co., Ltd., model: PIAS-II) and the deep color parts and the light color part, namely, whether a certain part is colored in black or not, are distinguished.

(4) Among the deep color parts, parts corresponding to an area of a circle having a diameter of not more than 7.5 mm, namely, parts which have a long diameter in the thickness direction but have only an area not more than that of a circle having a diameter of 7.5 mm are changed to light color, whereby the deep color parts are corrected.

(5) The area ratio of parts having a cell size of not more than 7.5 mm (light color parts) to the whole image is determined according to the following formula using "FRACTAREA (area ratio)" which is one of image analysis calculating functions.

Occupying area ratio (%)=(1−area of deep color parts/area of the whole image)×100

[8] Foam Thermal Conductivity

The thermal conductivity of a foam was measured according to JIS A 9511. The measurement was carried out 7 days or 3 months after the production of foams.

[9] Foam Compressive Strength

The compressive strength of a foam was measured according to JIS A 9511.

[10] Foam Flammability

The flammability of a foam was determined according to JIS A 9511. Acceptance was expressed by ○. Failure was expressed by X.

[11] Dimensional Stability

A foam extruded was cut and allowed to stand for 48 hours at room temperature, and thereafter a size change rate in the longitudinal direction was determined. Size change rates within ±0.5% are expressed by ○. Those exceeding ±0.5% are expressed by X.

[12] Heat Resistance

From a foam extruded is cut out a sample having a size of 100 mm×100 mm×25 mm (thickness) which is subsequently heated to 80° C. and allowed to stand for 24 hours in an oven. The sample is taken out to a condition of room temperature and allowed to stand for another 24 hours. After that, distances between the every two opposite sides of the sample having a size of 100 mm×100 mm are measured at three points of the sides which are positioned near the both ends of the sides and at their center, and average thereof is calculated. The case where the size change rate between before and after heating is within ±5% was evaluated as ○. On the other hand, the case of exceeding ±5% was evaluated as X.

[13] Environmental Compatibility

The environmental compatibility was evaluated by checking whether the blowing agents used are included in the existing chemical substances (14 substances) which exhibit mutagenicity listed in the notification No. 770-3 "The way to handle chemical substances exhibit mutagenicity" issued by Director-General of the Labor Standards Bureau of the Ministry of Labor dated Dec. 24, 1997: 1-acetyl-5-nitroindoline, ethyl chloride, methyl chloride, methylene chloride, methyl dichloroacetate, diborane, vinyl bromide, methyl bromide, silane, 2,4,6-trinitorophenol (picric acid), 1,3-butadiene, 2-bromopropane, p-benzoquinone oxime, and methyl iodide. The case of being not included in the above-listed compounds was evaluated as ○. The case of being included in the list was evaluated as X.

[14] Corrosion Resistance

An about 1.5 g iron piece as a test piece was added into a mixture prepared by adding 5 g of water to about 50 g of an volatile blowing agent shown in Table C2, and this was heated in a pressure ampoule lined with glass at 120° C. for 1 hour. After cooling, the test piece was weighed and the reduction in weight caused by corrosion was determined. The case where the reduction in weight of the test piece was not more than 0.1% by weight was evaluated as ○. The case of exceeding 0.1% by weight was evaluated as X.

[15] Knife Cutting Property

Using a single edge cutter having a thickness of 4 mm and an included angle of 7°, the cutter was put into a foam so as to cut the foam along a line 30 mm away from the edge of the foam in parallel to the flow direction with the tapered portion of the blade facing the edge side of the foam, and the blade is allowed to proceed. A foam which generates no cracks in the edge side as the blade proceeds, or which generates only one crack when the blade proceeds 50 mm or which generates only cracks which do not reach the edge of the foam was judged to be a conforming item.

EXAMPLE A1

To 100 parts of a polystyrene resin (manufactured by Asahi Chemical Industry Co., Ltd., commercial name: Styron G9401, melt index (MI): 2.0) were added 0.12 part of talc as a nucleating agent and 3.0 parts of hexabromocyclododecane as a flame retarder. To this mixture was introduced a blowing agent composed of 5.4 parts of dimethyl ether and 3.6 parts of propane under pressure while the mixture was heated to about 200° C. and kneaded in an extruder. After this, the resulting mixture was fed to a cooling and mixing machine and cooled to 110° C. Subsequently, the mixture was extruded and foamed through a 2 mm-gapped slit and a forming die having a clearance 35 mm in the thickness direction whose flowing surface is coated with a fluororesin to provide a board-like styrene resin foam. Its evaluation results are shown in Table A1. The foam obtained had excellent heat resistance, thermal conductivity (determined after 7 days elapsed and environmental compatibility. It also had excellent knife cutting property.

EXAMPLES A2 to A5

Foams were prepared by conducting the same operations as Example A1 except for changing the composition of the blowing agent and the mixing amount of talc. Their evaluation results are shown in Table A1. The foams obtained had excellent heat resistance, thermal conductivity (determined after 7 days elapsed) and environmental compatibility like the foam of Example A1. They also had excellent knife cutting property.

EXAMPLE A6

A foam was prepared by conducting the same operations as Example A1 except for changing the composition of the blowing agent and the mixing amount of talc. Its evaluation results are shown in Table A1. The foam obtained had excellent heat resistance, thermal conductivity (determined after 7 days elapsed) and environmental compatibility like the foam of Example 1. On the other hand, as for the knife cutting property, the foam was observed to generate a crack which reached the edge of the foam because of the addition of a great amount of inorganic substance.

COMPARATIVE EXAMPLE A1

A foam was prepared by conducting the same operations as Example A1 except for using a blowing agent composed of 5.9 parts of methyl chloride and 3.1 parts of propane and changing the mixing amount of talc to 0.7 part. Its evaluation results are shown in Table A2. As for the knife cutting property, the foam was observed to generate a crack which reached the edge of the foam because of the addition of a great amount of inorganic substance.

COMPARATIVE EXAMPLES A2 to A4

Foams were prepared by conducting the same operations as Example A1 except for changing the composition of the blowing agent and the mixing amount of talc. Their evaluation results are shown in Table A2.

TABLE A1

| Composition and evaluation | Example | | | | | |
| --- | --- | --- | --- | --- | --- | --- |
| | A1 | A2 | A3 | A4 | A5 | A6 |
| Total amount of blowing agents introduced under pressure (parts) | 9 | 9 | 9 | 9 | 9 | 9 |
| Amount of each blowing agent introduced under pressure (parts/% by weight) | | | | | | |
| Dimethyl ether | 5.4/60 | 5.4/60 | 5.4/60 | 5.0/55 | 5.9/65 | 5.4/60 |
| Methyl chloride | | | | | | |
| Propane | 3.6/40 | | | 4.0/45 | 3.1/35 | |
| n-Butane | | 3.6/40 | | | | |
| i-Butane | | | 3.6/40 | | | 3.6/40 |
| Nucleating agent (talc) (parts) | 0.12 | 0.1 | 0.12 | 0.14 | 0.12 | 0.7 |
| Foam density (kg/m$^3$) | 23 | 23 | 23 | 24 | 23 | 23 |
| Expansion ratio | 45 | 46 | 46 | 43 | 46 | 46 |
| Product thickness (mm) | 35 | 35 | 35 | 35 | 35 | 35 |
| Closed cell ratio (%) | 98 | 98 | 98 | 97 | 98 | 98 |
| Average cell size (mm) | 0.4 | 0.4 | 0.4 | 0.4 | 0.4 | 0.3 |
| Thermal conductivity (after 7 days) (kcal/m · hr · ° C.) | ≦0.034 | ≦0.034 | ≦0.034 | ≦0.034 | ≦0.034 | ≦0.034 |

TABLE A1-continued

|  | Example | | | | | |
| --- | --- | --- | --- | --- | --- | --- |
| Composition and evaluation | A1 | A2 | A3 | A4 | A5 | A6 |
| Heat resistance | ◯ | ◯ | ◯ | ◯ | ◯ | ◯ |
| Environmental compatibility | ◯ | ◯ | ◯ | ◯ | ◯ | ◯ |

TABLE A2

|  | Comparative Example | | | |
| --- | --- | --- | --- | --- |
| Composition and evaluation | A1 | A2 | A3 | A4 |
| Total amount of blowing agents introduced under pressure (parts) | 9 | 6 | 8 | 9 |
| Amount of each blowing agent introduced under pressure (parts/% by weight) | | | | |
| Dimethyl ether |  | 1.5/25 | 2.0/25 | 8.1/90 |
| Methyl chloride | 5.9/65 |  |  |  |
| Propane | 3.1/35 | 4.5/75 |  |  |
| n-Butane |  |  | 6.0/75 |  |
| i-Butane |  |  |  | 0.9/10 |
| Nucleating agent (talc) (parts) | 0.7 | 0.13 | 0.13 | 0.13 |
| Foam density (kg/m$^3$) | 23 | 31 | 29 | 28 |
| Expansion ratio | 46 | 34 | 36 | 38 |
| Product thickness (mm) | 35 | 35 | 35 | 35 |
| Closed cell ratio (%) | 98 | 90 | 93 | 42 |
| Average cell size (mm) | 0.7 | 0.5 | 0.5 | 0.4 |
| Thermal conductivity (after 7 days) (kcal/m · hr · °C.) | ≦0.034 | ≦0.034 | ≦0.034 | >0.034 |
| Heat resistance | ◯ | × | × | ◯ |
| Environmentai compatibility | × | ◯ | ◯ | ◯ |

The following Examples B1 to B17 are examples relating to the production of foams whose cell anisotropic ratio and average cell size in the thickness direction are specified. Comparative Examples B1 and B2 are comparative examples thereof.

EXAMPLE B1

To 100 parts of a polystyrene resin (manufactured by Asahi Chemical Industry Co., Ltd., commercial name: Styron G9401; melt index (MI): 2.0) were blended 0.2 part of talc as a nucleating agent, 3.0 parts of hexabromocyclododecane as a flame retarder, 0.3 part of barium stearate as a lubricant and 0.1 part of modified bisphenol A diglycidyl ether as a stabilizer together. The resulting mixture was fed to an extruder and heated and kneaded at about 200° C. To this mixture were introduced 5.5 parts of dimethyl ether and 3.0 parts of propane under pressure, and subsequently the resulting mixture was fed to a kneading and cooling machine and cooled so that the resin temperature became to be about 110 to 115° C. The mixture was extruded and foamed through a slit die and a forming die having a flowing surface coated with a fluororesin to provide a board-like styrene resin foam having a thickness of 100 mm and a width of 910 mm. The measurements are shown in Table B1.

EXAMPLES B2 and B3

Foam boards were prepared in the same manner as Example B1 except for changing the total amount of the blowing agents introduced under pressure to 9.0 parts (Example B2) and to 7.0 parts (Example B3) while setting the mixing weight ratio of dimethyl ether and propane to the same value (65/35) as Example B1. The measurements are shown together in Table B1.

EXAMPLES B4 and B5

Foam boards were prepared in the same manner as Example B1 except for changing the mixing weight ratio of dimethyl ether and propane to 78/22 (Example B4) and to 59/41 (Example B5) while setting the total amount of the blowing agents introduced under pressure to the same value (8.5 parts) as Example B1. The measurements are shown together in Table B1.

EXAMPLES B6 and B7

By changing the thickness of the extruded foam by changing the forming die, a foam having a thickness of 50 mm (Example B6) and a foam having a thickness of 20 mm (Example B7) were obtained. Other conditions were the same as those in Example B1. The measurements are shown together in Table B1.

EXAMPLES B8 to B10

By changing the blowing agent to 5.5 parts of dimethyl ether and 3.5 parts of butane, and changing the thickness of extruded foams by changing the forming die, a foam having a thickness of 100 mm (Example B8), a foam having a thickness of 45 mm (Example B9), and a foam having a thickness of 20 mm (Example B10) were provided. Other conditions were the same as those in Example B1. The measurements are shown together in Table B1.

All of the foams obtained in Examples B1 to B10 had the specified cell anisotropic ratio, average cell size in the thickness direction and foam density in the range of 26 to 35 kg/m$^3$. The thermal conductivity of these foams satisfied the thermal insulation characteristic of Class B2 provided in JIS A 9511, namely, not more than 0.029 kcal/m·hr·° C. Further, the foams were excellent in foam compressive strength and in foam flammability, and also in environmental compatibility.

Furthermore, the measurement of the thermal conductivity of the foam obtained in Example B1 six months after its production revealed that the foam had a thermal conductivity of 0.029 kcal/m·hr·° C.

EXAMPLE B11

A foam plate was prepared in the same manner as Example B1 except for changing the mixing weight ratio of dimethyl ether and propane to 53/47 while setting the total amount of the blowing agents introduced to the same value (8.5 parts) as Example B1. The measurements are shown together in Table B1. The foam obtained had the specified cell anisotropic ratio, average cell size in the thickness direction and foam density, and a thermal conductivity of 0.029 kcal/m·hr·° C. which satisfied the thermal insulation property of Class B2 provided in JIS A 9511. It, however, did not meet the provision of foam flammability at the time of seven days after the production of the foam. Additionally, an unstable phenomenon in the extrusion system such as pressure fluctuation was observed.

EXAMPLE B12

A foam having a thickness of 50 mm was obtained in the same manner as in Example B1 except for changing the amount of talc to 2.0 parts. The measurements are shown in Table B2. The foam had a cell anisotropic ratio of 1.36, an average cell size in the thickness direction of 0.23 mm and a foam thermal conductivity of 0.030 kcal/m·hr 19° C. which satisfied the thermal insulation property of Class B1 provided in JIS A 9511 but did not satisfy the thermal insulation property of Class B2.

EXAMPLE B13

A foam board was prepared in the same manner as Example B1 except for changing the total amount of the blowing agents introduced under pressure to 10.0 parts while setting the mixing weight ratio of dimethyl ether and propane to the same value (65/35) as Example B1. The measurements are shown together in Table B2. The foam board obtained had a foam density of 24 kg/m$^3$, a cell anisotropic ratio of 1.12, an average cell size in the thickness direction of 0.39 mm, and a foam thermal conductivity of 0.031 kcal/m·hr·° C. which satisfied the thermal insulation property of Class B1 provided in JIS A 9511 but did not satisfy the thermal insulation property of Class B2. In addition, an unstable phenomenon in the extrusion system such as pressure fluctuation was observed.

EXAMPLE B14

By changing the thickness of the extruded foam by changing the forming die, a foam having a thickness of 20 mm was obtained. Other conditions were the same as those in Example B1. The measurements are shown together in Table B2. The foam obtained had a foam density of 28 kg/m$^3$, a cell anisotropic ratio of 0.78, an average cell size in the thickness direction of 0.33 mm. Although it had a thermal conductivity of 0.027 kcal/m·hr·° C. which satisfied the thermal insulation property of Class B2 provided in JIS A 9511, it had a foam compressive strength of 1.9 kg/cm$^2$.

EXAMPLE B15

A foam board was prepared in the same manner as Example B8 except for changing the total amount of the blowing agents introduced under pressure to 11.0 parts while setting the mixing weight ratio of dimethyl ether and butane to the same value (61/39) as Example B8. The measurements are shown together in Table B2. The foam board obtained had a foam density of 23 kg/m$^3$, a cell anisotropic ratio of 1.07 and an average cell size in the thickness direction of 0.44 mm, and a foam thermal conductivity of 0.032 kcal/m·hr·° C. which satisfied the thermal insulation property of Class B1 provided in JIS A 9511 but did not satisfy the thermal insulation property of Class B2. In addition, an unstable phenomenon in the extrusion system such as pressure fluctuaion was observed.

EXAMPLE B16

A foam having a thickness of 45 mm was obtained by introducing 5.5 parts of dimethyl ether and 3.5 parts of butane under pressure, and setting the amount of talc to 2.0 parts. The other conditions were the same as in Example B8. The measurements are shown in Table B2. The foam obtained had a cell anisotropic ratio of 1.36, an average cell size in the thickness direction of 0.23 mm and a foam thermal conductivity of 0.030 kcal/m·hr·° C. which satisfied the thermal insulation property of Class B1 provided in JIS A 9511 but did not satisfy the thermal insulation property of Class B2.

EXAMPLE B17

A foam having a thickness of 20 mm was obtained by introducing 5.5 parts of dimethyl ether and 3.5 parts of butane under pressure, and setting the amount of talc to 2.0 parts. The other conditions were the same as in Example B8. The measurements are shown in Table B2. The foam obtained had a cell anisotropic ratio of 0.79 and an average cell size in the thickness direction of 0.39 mm, and a foam thermal conductivity of 0.027 kcal/m·hr·° C. which satisfied the thermal insulation property of Class B2 provided in JIS A 9511. It, however, had a foam compressive strength of 1.9 kg/cm$^2$.

COMPARATIVE EXAMPLES B1 and B2

A foam having a thickness of 75 mm (Comparative Example B1) and a foam having a thickness of 40 mm (Comparative Example B2) were obtained by using 6.0 parts of methyl chloride and 3.0 parts of propane and setting the amount of talc to 1.0 part. The other conditions were the same as in Example B1. The foam obtained in Comparative Example B1 had a cell anisotropic ratio of 1.42 and an average cell size in the thickness direction of 0.43 mm and a thermal conductivity of 0.031 kcal/m·hr·° C. The foam obtained in Comparative Example B2 had a cell anisotropic ratio of 1.25 and an average cell size in the thickness direction of 0.39 mm, and a thermal conductivity of 0.030 kcal/m·hr 19° C. Both of the foams did not satisfy the thermal insulation property of Class B2 provided in JIS A 9511. Additionally, methyl chloride is included in the existing chemical substances which exhibit mutagenicity.

TABLE B1

| Composition and evaluation | Example | | | | | | | | | | |
|---|---|---|---|---|---|---|---|---|---|---|---|
| | B1 | B2 | B3 | B4 | B5 | B6 | B7 | B8 | B9 | B10 | B11 |
| Total amount of blowing agents introduced under pressure (parts) | 8.5 | 9.0 | 7.0 | 8.5 | 8.5 | 8.5 | 8.5 | 9.0 | 9.0 | 9.0 | 8.5 |
| Amount of each blowing agent introduced under pressure (parts/% by weight) | | | | | | | | | | | |
| Dimethyl ether | 5.5/65 | 5.9/65 | 4.6/65 | 6.6/78 | 5.0/59 | 5.5/65 | 5.5/65 | 5.5/61 | 5.5/61 | 5.5/61 | 4.5/53 |
| Methyl chloride | | | | | | | | | | | |
| Propane | 3.0/35 | 3.1/35 | 2.4/35 | 1.9/22 | 3.5/41 | 3.0/35 | 3.0/35 | | | | 4.0/47 |
| Butane | | | | | | | | 3.5/39 | 3.5/39 | 3.5/39 | |
| Nucleating agent (talc) (parts) | 0.2 | 0.2 | 0.2 | 0.2 | 0.2 | 0.2 | 0.2 | 0.2 | 0.2 | 0.2 | 0.2 |
| Foam density (kg/m$^3$) | 29 | 26 | 35 | 28 | 30 | 30 | 28 | 28 | 28 | 29 | 28 |
| Product thickness (mm) | 100 | 100 | 100 | 100 | 100 | 50 | 20 | 100 | 45 | 20 | 100 |
| Average cell size in the thickness direction (mm) | 0.35 | 0.35 | 0.34 | 0.43 | 0.24 | 0.35 | 0.45 | 0.44 | 0.42 | 0.37 | 0.35 |
| Average cell size in the transverse direction (mm) | 0.31 | 0.28 | 0.29 | 0.39 | 0.17 | 0.34 | 0.55 | 0.40 | 0.45 | 0.46 | 0.28 |
| Average cell size in the longitudinal direction (mm) | 0.29 | 0.29 | 0.3 | 0.4 | 0.17 | 0.35 | 0.53 | 0.41 | 0.47 | 0.48 | 0.29 |
| Cell anisotropic ratio | 1.11 | 1.15 | 1.10 | 1.06 | 1.26 | 1.01 | 0.89 | 1.06 | 0.94 | 0.85 | 1.15 |
| −1.1 × k + 1.62 | 0.40 | 0.36 | 0.41 | 0.46 | 0.24 | 0.51 | 0.65 | 0.46 | 0.58 | 0.68 | 0.36 |
| Thermal conductivity (after 3 months) (kcal/m · hr · °C.) | 0.029 | 0.029 | 0.028 | 0.029 | 0.029 | 0.027 | 0.028 | 0.029 | 0.028 | 0.027 | 0.029 |
| Compressive strength (kg/cm$^2$) | 3.9 | 3.1 | 5.5 | 4.0 | 4.3 | 2.9 | 2.2 | 3.8 | 2.7 | 2.1 | 4.0 |
| Foam flammability | ○ | ○ | ○ | ○ | ○ | ○ | ○ | ○ | ○ | ○ | × |
| Environmental compatibility | ○ | ○ | ○ | ○ | ○ | ○ | ○ | ○ | ○ | ○ | ○ |
| Note | | | | | | | | | | | Pressure fluctuated, system unstable |

TABLE B2

| Composition and evaluation | Example | | | | | | Com. Ex. | |
|---|---|---|---|---|---|---|---|---|
| | B12 | B13 | B14 | B15 | B16 | B17 | B1 | B2 |
| Total amount of blowing agents introduced under pressure (parts) | 8.5 | 10.0 | 8.5 | 11.0 | 9.0 | 9.0 | 9.0 | 9.0 |
| Amount of each blowing agent introduced under pressure (parts/% by weight) | | | | | | | | |
| Dimethyl ether | 5.5/65 | 6.5/65 | 5.5/65 | 6.7/61 | 5.5/61 | 5.5/61 | | |
| Methyl chloride | | | | | | | 6.0/67 | 6.0/67 |
| Propane | 3.0/35 | 3.5/35 | 3.0/35 | | | | 3.0/33 | 3.0/33 |
| Butane | | | | 4.3/39 | 3.5/39 | 3.5/39 | | |
| Nucleating agent (talc) (parts) | 2.0 | 0.2 | 0.2 | 0.2 | 2.0 | 0.2 | 1.0 | 1.0 |
| Foam density (kg/m$^3$) | 30 | 24 | 28 | 23 | 29 | 27 | 29 | 30 |
| Product thickness (mm) | 50 | 100 | 20 | 100 | 45 | 20 | 75 | 40 |
| Average cell size in the thickness direction (mm) | 0.23 | 0.39 | 0.33 | 0.44 | 0.23 | 0.39 | 0.43 | 0.39 |
| Average cell size in the transverse direction (mm) | 0.16 | 0.33 | 0.47 | 0.40 | 0.15 | 0.55 | 0.26 | 0.29 |
| Average cell size in the longitudinal direction (mm) | 0.13 | 0.33 | 0.49 | 0.40 | 0.14 | 0.56 | 0.25 | 0.27 |
| Cell anisotropic ratio | 1.36 | 1.12 | 0.78 | 1.07 | 1.36 | 0.79 | 1.42 | 1.25 |
| −1.1 × k + 1.62 | 0.12 | 0.39 | 0.76 | 0.45 | 0.12 | 0.75 | 0.06 | 0.25 |
| Thermal conductivity (after 3 months) (kcal/m · hr · °C.) | 0.030 | 0.031 | 0.027 | 0.032 | 0.030 | 0.027 | 0.031 | 0.030 |
| Compressive strength (kg/cm$^2$) | 3.8 | 3.0 | 1.9 | 2.9 | 4.2 | 1.9 | 4.9 | 4.1 |
| Foam flammability | ○ | ○ | ○ | × | ○ | ○ | ○ | ○ |
| Environmental compatibility | ○ | ○ | ○ | ○ | ○ | ○ | × | × |
| Note | | Pressure fluctuated, system unstable | | Pressure fluctuated, system unstable | | | | |

EXAMPLES C1 and C2

To 100 parts of a polystyrene resin (manufactured by Asahi Chemical Industry Co., Ltd., commercial name: Styron G9401, melt index (MI): 2.0) were added 0.1 part of talc as a nucleating agent and 3.0 parts of hexabromocyclododecane as a flame retarder. To this mixture was introduced a blowing agent having the composition shown in Table C1 under pressure in the amount shown in Table C1 while the mixture was heated to about 200° C. and kneaded in an extruder. After this, the resulting mixture was fed to a kneading and cooling machine and cooled to about 115° C. Subsequently, the mixture was extruded and foamed through a 2 mm-gapped slit and a forming die having a clearance of 35 mm in the thickness direction mm whose flowing surface was coated with a fluororesin to provide a board-like styrene resin foam. As physical properties of the foams obtained, a foam density, a foam thermal conductivity (determined after 7 days elapsed), an average cell size, dimensional stability and environmental compatibility were tested. The results are shown in Table C1.

COMPARATIVE EXAMPLES C1 and C2

Foams were prepared in the same manner as in Examples C1 and C2 except for changing the kind and amount of the blowing agent. The results are shown in Table C1.

TABLE C1

|  | Example | | Com. Ex. | |
| --- | --- | --- | --- | --- |
| Composition and evaluation | C1 | C2 | C1 | C2 |
| Total amount of blowing agents introduced under pressure (parts) | 8.5 | 9.4 | 9.0 | 9.9 |
| Amount of each blowing agent introduced under pressure (parts/% by weight) | | | | |
| Dimethyl ether | 5.5/65 | 5.5/59 | | |
| Methyl chloride | | | 6.0/67 | 6.0/61 |
| Propane | 3.0/35 | | 3.0/33 | |
| Butane | | 3.9/41 | | 3.9/39 |
| Nucleating agent (talc) (parts) | 0.1 | 0.1 | 0.1 | 0.1 |
| Foam density (kg/m³) | 23 | 31 | 23 | 31 |
| Product thickness (mm) | 35 | 35 | 35 | 35 |
| Average cell size (mm) | 0.4 | 0.4 | 0.7 | 0.6 |
| Thermal conductivity (after 7 days) (kcal/m · hr · ° C.) | 0.028 | 0.025 | 0.031 | 0.027 |
| Dimensional stability | ○ | ○ | × | × |
| Environmental compatibility | ○ | ○ | × | × |

The results shown in Table C1 reveal that both of the foams obtained in Examples C1 and C2 have adequate foam densities and have excellent foam thermal conductivity and good dimensional stability, and also excellent environmental compatibility.

The following Examples C3 and C4 are examples relating to the production of foams having a cell structure composed of larger cells and smaller cells. Comparative Examples C3 and C4 are comparative examples thereof.

EXAMPLES C3 and C4

To 100 parts of a polystyrene resin (manufactured by Asahi Chemical Industry Co., Ltd., commercial name: Styron G9401, melt index (MI): 2.0) were added 0.1 part of talc as a nucleating agent, 0.25 part of a water-absorbing polymer, 0.1 part of anhydrous silica and 3.0 parts of hexabromocyclododecane as a flame retarder. To this mixture were introduced a blowing agent having the composition shown in Table C2 and water under pressure in amounts shown in Table C2 while the mixture was heated to about 200° C. and kneaded in an extruder. After this, the resulting mixture was fed to a kneading and cooling machine and cooled to about 115° C. Subsequently, the mixture was extruded and foamed through a 2 mm-gapped slit and a forming die having clearance of 35 mm in the thickness direction whose flowing surface was coated with a fluororesin to provide a board-like styrene resin foam. As physical properties of the foams obtained, a foam density, a foam thermal conductivity (determined after 7 days elapsed), a cell structure (an smaller cell occupying area ratio), dimensional stability and environmental compatibility were tested. The results are shown in Table C2.

In the foams obtained in Examples C3 and C4, when the occupying area ratio of cells having a cell size of not more than 0.25 mm in the section area of a foam was measured, it became clear that the foams were composed mainly of cells having a cell size of not more than 0.25 mm and cells having a cell size of 0.3 to 1 mm.

COMPARATIVE EXAMPLES C3 and C4

Foams were prepared in the same manner as in Examples C3 and C4 except for changing the kind and amount of the blowing agent. The results are shown in Table C1.

TABLE C9

|  | Example | | Com. Ex. | |
| --- | --- | --- | --- | --- |
| Composition and evaluation | C3 | C4 | C3 | C4 |
| Total amount of blowing agents introduced under pressure (parts) | 8.5 | 9.4 | 9.0 | 9.9 |
| Amount of each blowing agent introduced under pressure (parts/% by weight) | | | | |
| Dimethyl ether | 5.5/65 | 5.5/59 | | |
| Methyl chloride | | | 6.0/67 | 6.0/61 |
| Propane | 3.0/35 | | 3.0/33 | |
| Butane | | 3.9/41 | | 3.9/39 |
| Amount of water introduced under pressure (parts) | 0.5 | 0.5 | 0.5 | 0.5 |
| Nucleating agent (talc) (parts) | 0.1 | 0.1 | 0.1 | 0.1 |
| Foam density (kg/m³) | 31 | 30 | 31 | 30 |
| Product thickness (mm) | 35 | 35 | 35 | 35 |
| Smaller cell occupying area ratio (%) | 30 | 40 | 20 | 20 |
| Thermal conductivity (after 7 days) (kcal/m · hr · ° C.) | 0.025 | 0.024 | 0.027 | 0.026 |
| Dimensional stability | ○ | ○ | × | × |
| Corrosion resistance | ○ | ○ | × | × |
| Environmental compatibility | ○ | ○ | × | × |

The results shown in Table C2 reveal that both of the foams obtained in Examples C3 and C4 have adequate foam densities and have cell structures wherein ratios of the area occupied by cells having a cell size of not more than 0.25 mm in the section area of a foam are not less than 30%. It is also clear that the foams are excellent in foam thermal conductivity and dimensional stability and also excellent in corrosion resistance and environmental compatibility.

EXAMPLE C5

The measurement of average cell size in each direction and a cell anisotropic ratio of the foam obtained in the same manner as Example C3 revealed that the foam had an average cell size in the thickness direction (a) of 0.28 mm, an average cell size in the transverse direction (b) of 0.27 mm, an average cell size in the longitudinal direction (c) of 0.28 mm, and a cell anisotropic ratio of 1.01. The foams satisfied the specified cell anisotropic ratio and average cell size in the thickness direction.

According to the present invention, foams having excellent environmental compatibility, thermal insulation property and dimensional stability can be obtained because of the use of a combination of the specific non-halogen blowing agents. Particularly, lightweight foams having an excellent thermal insulation property, that is, a foam thermal conductivity of not more than 0.029 kcal/m·hr·° C. and excellent mechanical properties can be obtained by providing a more desirable cell structure such as a specified shape of cells or the presence of larger and smaller cells. Additionally, in the case of adding water in order to obtain a desirable cell structure in which larger and smaller cells coexist, since no chlorine-containing compounds are used as a blowing agent, hydrochloric acid does not generate from a reaction of water and a blowing agent. This makes the solution of the corrosion problem of apparatus possible, whereby foams can be produced stably.

What is claimed is:

1. A method for producing an extruded styrene resin foam, comprising heat-melting, and kneading a styrene resin, introducing a blowing agent into the styrene resin under pressure and conducting extrusion foaming, wherein the blowing agent consists essentially of 40% by weight or more and 65% by weight or less, based on the whole amount of the blowing agent, of at least one ether selected from the group consisting of dimethyl ether, methyl ethyl ether and diethyl ether, and 35% by weight or more and 60% by weight or less, based on the whole amount of the blowing agent, of at least one saturated hydrocarbon selected from the group consisting of saturated hydrocarbons having 3 to 5 carbon atoms.

2. The method for producing an extruded styrene resin foam according to claim 1, wherein a weight ratio of the ether to the whole blowing agent is 50% by weight or more and less than 65% by weight and a weight ratio of the saturated hydrocarbon to the whole blowing agent is more than 35% by weight and 50% by weight or less.

3. The method for producing an extruded styrene resin foam according to claim 1, wherein the extruded styrene resin foam has a cell anisotropic ratio k, which is defined by the formula:

$$k = a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfying the equation:

$$0.80 \leq k \leq 1.26$$

and an average cell size, a, in the thickness direction satisfying the relationship:

$$0.24 \leq a \leq -1.1 \times k + 1.62.$$

4. The method for producing an extruded styrene resin foam according to claim 3, wherein the foam has a density of 26 to 35 kg/m³.

5. The method for producing an extruded styrene resin foam according to claim 3, wherein the cells constituting the foam comprise mainly smaller cells having a cell size of 0.25 mm or less and larger cells having a cell size of 0.3 to 1 mm, and the area of smaller cells having a cell size of 0.25 mm or less accounts for 10 to 90% of a sectional area of the foam.

6. The method for producing an extruded styrene resin foam according to claim 1, wherein the foam has a density of 15 to 40 kg/m³.

7. The method for producing an extruded styrene resin foam according to claim 3, wherein the foam has a thermal conductivity of not more than 0.029 kcal/m·hr·° C.

8. A method for producing an extruded styrene resin foam, comprising heat-melting and kneading a styrene resin, introducing a blowing agent into the styrene resin under pressure and conducting extrusion foaming, wherein the blowing agent consists essentially of 40% by weight or more and 65% by.weight or less, based on the whole amount of the blowing agent, of at least one ether selected from the group consisting of dimethyl ether, methyl ethyl ether and diethyl ether, and 35% by weight or more and 60% by weight or less, based on the whole amount of the blowing agent, of at least one saturated hydrocarbon selected from the group consisting of saturated hydrocarbons having 3 to 5 carbon atoms, wherein the extruded styrene resin foam has a cell anisotropic ratio k, which is defined by the formula:

$$k = a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfying the equation:

$$0.80 \leq k \leq 1.26$$

and an average cell size, a, in the thickness direction satisfying the relationship:

$$0.24 \leq a \leq -1.1 \times k + 1.62.$$

wherein the cells constituting-the foam comprise mainly smaller cells having a cell size of 0.25 mm or less and larger cells having a cell size of 0.3 to 1 mm, and the area of smaller cells having a cell size of 0.25 mm or less accounts for 10 to 90% of a sectional area of the foam, wherein 0.05 to 2 parts by weight of at least one water-absorbing material selected from the group consisting of a water-absorbing polymer, inorganic powder having hydroxyl groups on its surface and silicate powder, and 0.2 to 1.5 parts by weight of water are made to exist in 100 parts by weight of the styrene resin when performing the extrusion foaming.

9. The method for producing an extruded styrene resin foam according to claim 1, wherein the cells constituting the foam comprise mainly smaller cells having a cell size of 0.25 mm or less and larger cells having a cell size of 0.3 to 1 mm, and the area of the smaller cells having a cell size of 0.25 mm or less accounts for 10 to 90% of a sectional area of the foam.

10. The method for producing an extruded styrene resin foam according to claim 11, wherein the foam has a density of 26 to 35 kg/m³.

11. The method for producing an extruded styrene resin foam according to claim 1, wherein the foam has a thermal conductivity of not more than 0.029 kcal/m·hr·° C.

12. The method for producing an extruded styrene resin foam according to claim 9, wherein 0.05 to 2 parts by weight of at least one water-absorbing material selected from the group consisting of a water-absorbing polymer, inorganic powder having hydroxyl groups on its surface and silicate powder, and 0.2 to 1.5 parts by weight of water are made to exist in 200 parts by weight of the styrene resin when performing the extrusion.

* * * * *